2,700,026

PLASTICIZED POLYMER LATEXES AND METHOD OF MAKING

Carl L. Dibert, St. Louis, Mich., assignor to The Dow Chemical Company, Midland, Mich., a corporation of Delaware No Drawing. Application April 28, 1953,
Serial No. 351,735

9 Claims. (Cl. 260—29.6)

This invention relates to aqueous dispersions of plasticized polymers of monovinyl-mononuclear aromatic hydrocarbons. It concerns especialy improved latexes of plasticized polymers of styrene and of vinyltoluene, and a method of making such latexes.

Aqueous latexes of plasticized polystyrene and related polymers are useful as coating materials, and can be admixed with pigments or fillers, etc., to obtain paints or other coating compositions. On evaporation of water from a thin layer of such latex-containing composition, a film or pigment-binding deposit is obtained. It has hitherto been proposed to make such latexes, and various modifications thereof, by two general methods, viz. (1) polymerization of a dispersed monomer in the presence of a plasticizer; (2) addition of plasticizer to a latex of a preformed, non-plasticized polymer. Theoretically, these methods should produce substantially the same kind of product. Practically, the methods vary widely in the kind of product obtained and in the difficulties encountered. The addition of plasticizer to a latex of a preformed polymer is attended by many difficulties, in particular the difficulties of obtaining uniform plasticization of the dispersed polymer particles, each having a protective colloid barrier, without coagulating the latex. Nevertheless, this method has been preferred because of the even greater difficulties of making a high molecular weight polymer latex by polymerization of monomeric substances in the presence of plasticizers. The presence of plasticizers during the emulsion polymerization of styrene and related materials often inhibits the polymerization and/or causes the formation of low molecular weight rather than the desired high molecular weight polymer and/or causes the emulsion to "break," i. e. coagulate partially or completely. When, in the past, monomers were polymerized in the presence of plasticizers, the polymer was sometimes not, or only slightly, plasticized, the plasticizer having separated out as a separate dispersion or even as a separate layer or as sticky masses. Even when a plasticized latex product does result from such a process, the latex is usually unstable, i. e. tends readily to separate or coagulate, or is unsuitable for the preparation of coatings compositions.

The object of this invention is to provide improved aqueous latexes of plasticized polymers of monovinyl-mononuclear aromatic hydrocarbons, e. g. styrene and nuclear-substituted alkylstyrenes such as vinyltoluene. A particular object is to provide such latexes which are suitable as, or in the preparation of, coatings compositions. A further object is to provide a method of making such latexes. Other objects and advantages will be evident from the following description.

The objects of this invention are attained in improved latexes, made by a method hereinafter described in detail, which comprise aqueous dispersions of polymers of monovinyl-mononuclear aromatic hydrocarbons plasticized with a plasticizer consisting predominately of the liquid, low molecular weight polymers of alpha-methyl styrene as hereinafter specified.

More specifically, the improved latexes are made by the following procedure.

A solution is prepared, consisting of from 50 to 70, preferably from 50 to 55, per cent by weight of at least one monomeric monovinyl-mononuclear aromatic hydrocarbon, e. g. styrene, or vinyltoluene, etc., and from 50 to 30, preferably from 50 to 45, per cent by weight of the plasticizer. The plasticizer comprises at least 85 per cent by weight of a low-molecular weight polymer of alpha-methylstyrene, having a viscosity of from 700 to 1000 centipoises at a temperature of 60° C. and consisting principally of one or more saturated lower polymers of alpha-methylstyrene ranging from the dimer to the tetramer. Up to 15 per cent of the alpha-methylstyrene polymer may be replaced, if desired, by any solvent-type plasticizer for polystyrene, especially the ester-type plasticizers, e. g. di-cyclohexyl phthalate, dioctyl phthalate, butyl cyclohexyl phthalate, triethyleneglycol di-2-ethylhexoate, and triethyleneglycol di-caprylate, but these are not required and the alpha-methylstyrene polymer plasticizer alone may be used. The solution is prepared by mixing the components in any desired manner, e. g. by stirring together, until uniformly blended. The mixture may be warmed to facilitate mixing, if desired.

The vinyltoluene herein referred to is any isomer, or mixture of isomers, of nuclear substituted methylstyrene, preferably meta-vinyltoluene (meta-methylstyrene), para-vinyltoluene (para-methylstyrene), and mixtures thereof.

An aqueous medium is also prepared, comprising water and an emulsifier and preferably comprising also a buffering agent and a polymerization catalyst. The preferred aqueous medium is an alkaline water solution of (a) from 0.08 to 10.0 per cent by weight of one or more members of a certain group of anionic emulsifiers, (b) from 0.8 to 10.0 per cent by weight of one or more members of a certain group of non-ionic emulsifiers, (c) from 0.12 to 1.2 per cent by weight of potassium persulfate as a polymerization catalyst and (d) from 0.076 to 0.9 per cent by weight of a pH buffer comprising an alkali metal bicarbonate selected from the group consisting of sodium bicarbonate and potassium bicarbonate. The anionic emulsifiers are sodium salts of alkylated benzene sulfonic acids wherein the alkyl substituent has from 8 to 16 carbon atoms. The non-ionic emulsifiers are octylphenyl monoethers of polyethylene glycols, which ethers have average molecular weights of from 559 to 735 and are condensation products of actylphenol with from 8 to 12 moles of ethylene oxide. The non-ionic emulsifier may be dissolved in the monomer-plasticizer mixture, instead of in the aqueous medium, if desired. The potassium persulfate and the alkali metal bicarbonate may be withheld from the aqueous medium and added after the formation of the oil-in-water emulsion as described below.

The monomer-plasticizer mixture is then dispersed in the aqueous medium to form an oil-in-water emulsion, 100 parts by weight of monomer-plasticizer mixture being dispersed in from 50 to 250, preferably 65 to 120, parts by weight of aqueous medium corresponding to from about 39 to 245, preferably 54 to 115, parts of water. The amount and composition of the monomer-plasticizer mixture and of the aqueous medium are so chosen as to contain, in parts by weight per 100 parts of the monomer-plasticizer mixture, from 2 to 5 parts of the anionic emulsifier, from 2 to 5 parts of the non-ionic emulsifier, and from 0.3 to 0.6 part of potassium persulfate and from 0.19 to 0.45 part of alkali-metal bicarbonate if these are present.

The dispersion of the monomer-plasticizer mixture in the aqueous medium should be such that the diameter of the particles of the dispersed phase is less than about 2 microns, preferably from about 0.5 to 1.5 microns. A suitable procedure is to make a preliminary dispersion of the monomer-plasticizer mixture in the aqueous medium by any conventional means of mixing and to subject this preliminary dispersion to a further homogenization step, e. g. by passing it, repeatedly if necessary, through a shear-type homogenizer. The preparation of the emulsion is preferably effected at a temperature of from 50° to 90° C.

After the dispersion is completed, the catalyst for the polymerization and the pH buffer may be added, if not already present, in the proportions previously indicated.

The monomeric monovinyl-mononuclear aromatic hydrocarbon, e. g. styrene or vinyltoluene, in the dispersion is then polymerized by heating, with gentle agitation, preferably in a closed vessel, at an elevated temperature, preferably between 75° and 95° C., until polymerization is substantially complete, usually for 3 to 6 hours.

Under the particular conditions described above, the emulsion remains stable before, during and after the polymerization. The plasticizer does not inhibit the polymerization in any way, does not interfere with the formation of high molecular weight polymers of the charged monomers, and does not cause the agglomeration of the dispersed particles. The dispersion is stable to the physical effects of heat and agitation and to the physical-chemical effects of catalytic polymerization.

The polymerization products are stable, uniform aqueous latex dispersions of uniformly plasticized polymers. The latexes are alkaline, i. e. have a pH greater than 7, preferably 7–9. Thin layers of the dispersions dry by evaporation of water to form transparent, tough, rubbery, non-tacky films. Finely-divided pigments and solid fillers can be intimately mixed with the latexes to form stable compositions that, as thin layers on a supporting surface, dry to films in which the plasticized polymers function to bind the pigment together and to the supporting surface. These latexes and compositions made therefrom are especially advantageous because the plasticizer, namely the low molecular weight polymer of alpha-methylstyrene, is relatively non-volatile and non-migratory, i. e. does not evaporate from the compositions and is not readily absorbed by other plastic or absorbent materials in contact therewith. Therefore, these plasticized compositions retain their characteristic properties.

The plasticized polymer latexes are useful as, or in preparation of, coatings materials, e. g. latex paints, for cloth, paper, exterior and interior walls of masonry, concrete, plaster, stucco, etc. and as adhesive or binder, e. g. in making bonded fiber batts, "unwoven cloth" and the like.

The invention will now be illustrated by examples, which should not be construed as limiting the invention.

EXAMPLE 1

A mixture was prepared containing 50 grams of monomeric styrene, 50 grams of a liquid, low molecular weight polymer of alpha-methylstyrene having a viscosity at 60° C. of about 900 centipoises, and 3 grams of an octylphenyl monoether of ethylene polyglycol having a molecular weight of about 647 (about 10 ethoxy units) by warming the mixture to a temperature of about 50° C. and stirring.

An aqueous solution was prepared containing 107.2 grams of water and 3 grams of an anionic emulsifier, principally the sodium salt of dodecylbenzenesulfonic acid.

Both the styrene-plasticizer mixture and the aqueous solution were heated to a temperature of about 70° C., and the styrene-plasticizer mixture was slowly added to the aqueous solution with stirring. The milky oil-in-water emulsion was then homogenized by recycling through a pulsating, rotary shear, liquid-liquid homogenizer of a kind conventionally used for homogenizing milk, maintaining a temperature of about 70° C.

To the homogenized dispersion was added 0.6 gram of potassium persulfate and 0.6 gram of sodium bicarbonate.

The dispersion was closed in a polymerization vessel and heated at a temperature of about 85° C., with mild agitation to assist in heat transfer, for a period of about 4 hours, after which the latex product was cooled and removed.

EXAMPLE 2

By a procedure similar to that described in Example 1, a latex was made by polymerizing 50 grams of styrene in the presence of a mixture of 47 grams of the low molecular weight alpha-methylstyrene polymer and 3 grams of triethyleneglycol di-caprylate. A layer of the latex 0.010 inch thick was placed on a glass plate and dried in air at room temperature. The dried film was clear, continuous, glossy, strong, and fairly elastic. For purposes of comparison, samples of two commercially available plasticized polystyrene latexes, identified as latexes A and B, were similarly tested. These commercial latexes are believed to have been made by adding plasticizer to pre-formed polystyrene latexes. Dried films from the commercial latexes were continuous films, but were hazy, dull and weak. Moreover, the commercial latexes separated on standing in a closed container, a portion of the composition settling out of suspension and forming two layers. The latex made according to this example remained perfectly dispersed during several months of observation.

A paint was made from each of the above-described latexes by intimately mixing the following substances, added together in the order shown:

|   | G. |
|---|---|
| 1. Pigment slurry [1] | 251.9 |
| 2. Casein (15% aqueous solution ammonia-solubilized) | 35.6 |
| 3. Phenolic preservative (15% aqueous solution) | 6.8 |
| 4. Antifoamer | 1.4 |
| 5. Latex adjusted to 48% solids | 206.0 |

[1] The pigment slurry was a pebble-mill grind of:

|   | G. |
|---|---|
| Titanium dioxide | 113.8 |
| Lithopone | 32.4 |
| Mica | 16.1 |
| Casein | 1.6 |
| Aqueous ammonia, 28% | 0.5 |
| Phenolic preservative | 1.5 |
| Water | 86.0 |

Samples of the paints so-prepared were tested for resistance to scrubbing as follows. Layers of the paints 0.009 inch thick were cast on oil-paint-primed metal panels and dried in the air at room temperature for one day. The dried paint films were then scrubbed with a one-pound brush reciprocating in a straight line and wet with a dilute aqueous soap solution. The number of cycles of such scrubbing before first failure of the paint film occurred was noted, as well as the condition of the paint film at the conclusion of the test. These data are shown below:

*Scrub cycles*

| Paint Made From— | Initial Failure | Final | Condition |
|---|---|---|---|
| Latex of this Example | 193 | 1,769 | 20% removed. |
| Commercial Latex A | 109 | 120 | almost completely removed. |
| Commercial Latex B | 182 | 2,000 | 40% removed. |

EXAMPLE 3

By a procedure similar to that described in Example 1, a latex was made by polymerizing 55 grams of styrene in the presence of a mixture of 42 grams of the low molecular weight alpha-methylstyrene polymer and 3 grams of di-octyl phthalate. The latex so produced was compounded with pigment, by a procedure similar to that described in Example 2, to make a paint which was cast as a thin layer, dried and tested for resistance to scrubbing as hereinbefore described. The scrub-test data for the paint made from the latex of this example and paints made from the commercial plasticized polystyrene latexes described in Example 2 are shown below.

*Scrub cycles*

| Paint Made From— | Initial Failure | Final | Condition |
|---|---|---|---|
| Latex of this Example | 415 | 2,536 | 10% removed. |
| Commercial Latex A | 109 | 120 | almost completely removed. |
| Commercial Latex B | 182 | 2,000 | 40% removed. |

EXAMPLE 4

By a procedure similar to that described in Example 1, a latex was made by polymerizing 55 grams of vinyltoluene (a mixture of meta-vinyltoluene and para-vinyltoluene) in the presence of a mixture of 40 grams of the low molecular weight alpha-methylstyrene polymer and 5 grams of di-octyl phthalate. The latex so produced was compounded with pigment, by a procedure similar to that described in Example 2, to make a paint which was cast as a thin layer, dried and tested for resistance to scrubbing as hereinbefore described. The dried paint film required about 300 scrub-cycles before first signs of failure (loss of gloss) appeared, and after 2400 cycles only about 1 per cent of the paint film had been removed.

I claim:
1. An alkaline aqueous dispersion of a plasticized poly- mer said dispersion comprising, by weight; from 50 to 70 parts of a polymer consisting of the product of polymerization of at least one monovinyl-mononuclear aromatic hydrocarbon; from 50 to 30 parts of a plasticizer, the polymer and plasticizer together being 100 parts, said plasticizer comprising at least 85 per cent by weight of a homopolymer of alpha-methylstyrene having a viscosity of from 700 to 1000 centipoises at a temperature of 60° C.; from 2 to 5 parts of a sodium alkylbenzenesulfonate wherein the alkyl radical has from 8 to 16 carbon atoms; from 2 to 5 parts of an octylphenyl monoether of a polyethylene glycol, having a molecular weight of from about 559 to about 735; and from about 39 to about 245 parts of water.

2. A dispersion as claimed in claim 1, wherein the monovinyl-mononuclear aromatic hydrocarbon is styrene.

3. A dispersion as claimed in claim 1, wherein the monovinyl-mononuclear aromatic hydrocarbon is vinyltoluene.

4. An alkaline aqueous latex of a plasticized polymer comprising, by weight; from 50 to 55 parts of a polymer consisting of the product of polymerization of at least one monovinyl-mononuclear aromatic hydrocarbon selected from the group consisting of styrene and vinyltoluene; from 50 to 45 parts of a plasticizer, the polymer and plasticizer together being 100 parts, said plasticizer comprising at least 85 per cent by weight of a homopolymer of alpha-methylstyrene having a viscosity of from 700 to 1000 centipoises at a temperature of 60° C.; from 2 to 5 parts of a sodium alkylbenzenesulfonate wherein the alkyl radical has from 8 to 16 carbon atoms; from 2 to 5 parts of an octylphenyl mono-ether of a polyethylene glycol having a molecular weight of from about 559 to about 735; and from about 54 to about 115 parts of water.

5. A method which comprises forming an aqueous dispersion comprising, by weight, 100 parts of a mixture of from 50 to 70 parts of a monovinyl-mononuclear aromatic hydrocarbon and from 50 to 30 parts of a plasticizer, said plasticizer comprising at least 85 per cent by weight of a homopolymer of alpha-methylstyrene having a viscosity of from 700 to 1000 centipoises at a temperature of 60° C., from 2 to 5 parts of a sodium alkylbenzenesulfonate wherein the alkyl radical has from 8 to 16 carbon atoms, from 2 to 5 parts of an octylphenyl mono-ether of a polyethylene glycol having a molecular weight of from about 559 to about 735, from 0.3 to 0.6 part of potassium persulfate, from 0.19 to 0.45 part of an alkali metal bicarbonate selected from the group consisting of sodium bicarbonate and potassium bicarbonate, and from about 39 to about 245 parts of water, and polymerizing the monovinyl-mononuclear aromatic hydrocarbon while dispersed in said dispersion.

6. A method which comprises the steps of (A) forming a first mixture containing from 50 to 70 parts by weight of at least one monovinyl-mononuclear aromatic hydrocarbon, from 50 to 30 parts by weight of a plasticizer, the monovinyl-mononuclear aromatic hydrocarbon and the plasticizer together being 100 parts by weight, said plasticizer comprising at least 85 per cent by weight of a homopolymer of alpha-methylstyrene having a viscosity of from 700 to 1000 centipoises at a temperature of 60° C., and from 2 to 5 parts by weight of an octylphenyl mono-ether of a polyethylene glycol, having a molecular weight of from about 559 to about 735; (B) forming 50 to 250 parts by weight of a second mixture containing water and from 2 to 5 parts by weight of a sodium alkylbenzenesulfonate wherein the alkyl radical has 8 to 16 carbon atoms; (C) dispersing the first mixture into the second mixture at a temperature of from 50° to 90° C. to form an emulsion in which the particles of the dispersed phase have a diameter of less than about 2 microns; (D) adding to said emulsion from 0.3 to 0.6 part by weight of potassium persulfate and from 0.19 to 0.45 part by weight of an alkali metal bicarbonate selected from the group consisting of sodium bicarbonate and potassium bicarbonate; and (E) polymerizing said monovinyl-mononuclear aromatic hydrocarbon while dispersed in said emulsion by heating at a temperature between 75° and 95° C.

7. A method as claimed in claim 6 wherein the monovinyl-mononuclear aromatic hydrocarbon is styrene.

8. A method as claimed in claim 6 wherein the monovinyl-mononuclear aromatic hydrocarbon is vinyltoluene.

9. A method which comprises the steps of (A) forming a first mixture containing from 50 to 55 parts by weight of at least one monovinyl-mononuclear aromatic hydrocarbon selected from the group consisting of styrene and vinyltoluene, from 50 to 45 parts by weight of a plasticizer, the monovinyl-mononuclear aromatic hydrocarbon and the plasticizer together being 100 parts by weight, said plasticizer comprising at least 85 per cent by weight of a homopolymer of alpha-methylstyrene having a viscosity of from 700 to 1000 centipoises at a temperature of 60° C., and from 2 to 5 parts by weight of an octylphenyl mono-ether of a polyethylene glycol, having a molecular weight of from about 559 to about 735; (B) forming 65 to 120 parts by weight of a second mixture containing water and from 2 to 5 parts by weight of a sodium alkylbenzenesulfonate wherein the alkyl radical has from 8 to 16 carbon atoms; (C) dispersing the first mixture into the second mixture at a temperature of from 50° to 90° C. to form an emulsion in which the particles of the dispersed phase have a diameter of less than about 2 microns; (D) adding to said emulsion from 0.3 to 0.6 part by weight of potassium persulfate and 0.19 to 0.45 part by weight of an alkali metal bicarbonate selected from the group consisting of sodium bicarbonate and potassium bicarbonate; and (E) polymerizing said monovinyl-mononuclear aromatic hydrocarbon while dispersed in said emulsion by heating at a temperature between 75° and 95° C.

References Cited in the file of this patent

UNITED STATES PATENTS 2,493,965    Haefele _____ Jan. 10, 1950

OTHER REFERENCES

Official Digest, August 1950, pages 585 to 593.